United States Patent
Sarkissian et al.

(10) Patent No.: US 11,693,160 B2
(45) Date of Patent: Jul. 4, 2023

(54) MODULAR PHOTONIC REFLECTORS

(71) Applicant: HRL Laboratories, LLC, Malibu, CA (US)

(72) Inventors: Raymond Sarkissian, Malibu, CA (US); Phuong Phuc Nam Bui, Thousand Oaks, CA (US); Tobias Anton Schaedler, Malibu, CA (US); Shanying Cui, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 138 days.

(21) Appl. No.: 17/322,481

(22) Filed: May 17, 2021

(65) Prior Publication Data
US 2022/0365259 A1 Nov. 17, 2022

(51) Int. Cl.
*G02B 5/02* (2006.01)
*G02B 1/00* (2006.01)
*G02B 5/124* (2006.01)
*F02F 1/18* (2006.01)
*F02K 9/00* (2006.01)

(52) U.S. Cl.
CPC .......... *G02B 5/0284* (2013.01); *G02B 1/005* (2013.01); *G02B 5/124* (2013.01); *F02F 1/18* (2013.01); *F02K 9/00* (2013.01); *F05D 2300/504* (2013.01)

(58) Field of Classification Search
CPC ...... G02B 1/005; G02B 5/124; G02B 5/0284; G02B 5/021; G02B 5/0221; G02B 6/0051; G02B 5/0247; G02B 6/0053; G02B 6/0025; F05D 2300/504; G02F 1/133504
See application file for complete search history.

(56) References Cited

U.S. PATENT DOCUMENTS

| | | | | |
|---|---|---|---|---|
| 6,750,393 B2 * | 6/2004 | Wada | ........................ | F02K 9/60 |
| 2004/0057472 A1 * | 3/2004 | Takiguchi | ............ | G02B 6/4204 |
| | | | | 372/20 |
| 2008/0042546 A1 * | 2/2008 | Huang | .................. | B82Y 20/00 |
| | | | | 313/495 |
| 2011/0128625 A1 | 6/2011 | Larsen et al. | | |

(Continued)

OTHER PUBLICATIONS

J.J. do Rosario et al.: "Advancing the fabrication of YSZ-inverse photonic glasses for broadband omnidirectional reflector films", Elsevier Ltd., Journal of the European Ceramic Society 39 (2019), pp. 3353-3363. https://doi.org/10.1016/j.jeurceramsoc.2019.04.028.

(Continued)

*Primary Examiner* — Jonathan Y Jung
(74) *Attorney, Agent, or Firm* — Wheatstone IP Law Corporation; Milad G. Shara (57) ABSTRACT

A photonic reflector device includes a first layer, a second layer, and a third layer. The first layer, which functions as a retro-reflector, is formed of a first material contacting a second material and having a non-planar interface therebetween. The second layer, which functions as a photonic crystal, includes third and fourth materials that have different refractive indices from one another and are configured such that the second layer has a periodic optical potential along at least one dimension. The third layer, which functions as a Lambertian scatterer, includes a plurality of inclusions in a first matrix material. In combination, the layers may be optimized to synergistically reflect targeted wavelengths and/or polarizations of light.

11 Claims, 6 Drawing Sheets

(56) References Cited

U.S. PATENT DOCUMENTS

| | | | |
|---|---|---|---|
| 2012/0273911 A1* | 11/2012 | Shigeta | H01L 31/02327 257/E31.128 |
| 2013/0063821 A1* | 3/2013 | Chung | C23C 14/34 977/773 |
| 2017/0276849 A1* | 9/2017 | Langner | G01J 3/26 |

OTHER PUBLICATIONS

P. Mogilevsky et al.; "In situ Y2Si2O7 coatings on SiC fibers: Thermodynamic analysis and processing", J. Am. Ceramic Society, (2019) 102: 167-177. https://doi.org/10.1111/jace.15905.

P. Schultz et al.; "Investigation of five types of switchable retroreflector films for enhanced visible and infrared conspicuity applications", University of Cincinnati, Cincinnati, Ohio, USA, Applied Optics, vol. 51, No. 17, (Jun. 10, 2012), pp. 3744-3754. https://doi.org/10.1364/AO.51.003744.

P. Tasso ; "Subsolidus, High temperature phase relations in the systems Al2O3—Cr2O3—ZrO2, MgO—Cr2O3—ZrO2, and MgO—Al2O3—ZrO2", J. Materials Science, 21 (1986), No. 10, p. 3479-3482. https://doi.org/10.1007/BF02402990.

* cited by examiner

1010
Provide a photonic reflector device on an inner surface of a cavity having a heat source contained within a cavity the photonic reflector device comprising a first layer having a first side opposite a second side, a second layer including a photonic crystal adjacent to the second side of the first layer, and a third layer on an opposite side of the second layer from the first layer

1020
cause heat source to emit heat flux, at least a portion of the heat flux being incident on and reflected by the photonic reflector device the first layer reflects at least 30% of the heat flux incident on the first side; the third layer scatters at least some of the heat flux that is transmitted through the first and second layers via diffuse reflection; and at least 95% of the heat flux that is reflected by the second and third layers and is incident on the second side of the first layer is transmitted through the first layer.

Fig. 11

MODULAR PHOTONIC REFLECTORS

TECHNICAL FIELD

This disclosure relates to photonic reflector devices.

BACKGROUND

In many devices in which substantial heat is generated within an enclosing structure (e.g., combustion chambers, exhausts, engines, etc.), it may be desirable to contain the generated heat and associated heat flux in order to prevent heating of adjacent electronics or other components. While thermal barriers or coatings for such applications exist, improvements in thermal barrier performance are desirable.

SUMMARY

A photonic reflector device according to an example embodiment includes a first layer having a first side opposite a second side, a second layer comprising a photonic crystal, and a third layer configured to scatter incident light having a wavelength in a range of 0.4 μm to 5 μm. The first layer is configured to reflect at least 30% of light having a wavelength in a range of 0.4 μm to 5 μm that is incident on the first side 156 and to reflect less than 5% of light having a wavelength in a range of 0.4 μm to 5 μm that is incident on the second side. The photonic crystal may be configured to have a periodic optical potential. The photonic reflector device may be configured to reflect at least 70% of light having a wavelength in a range of 0.4 μm to 5 μm that is incident on the first side of the first layer. Also, the second side of the first layer may be between the second layer and the first side of the first layer, and the second layer may be between the first layer and the third layer. The third layer may be configured to reflect at least 30% of light that is transmitted through the first and second layers. The third layer may be configured to scatter the incident light via diffuse reflection.

A photonic reflector device according to another example embodiment includes a first layer comprising a first material contacting a second material, the first and second materials having a non-planar interface therebetween, wherein a first refractive index of the first material is at least 1.1 times a second refractive index of the second material. The photonic reflector device further includes a second layer comprising a third material and a fourth material having different refractive indices from one another, wherein the third and fourth materials are configured such that the second layer has a periodic optical potential along at least one dimension. Also, the photonic reflector device includes a third layer comprising a plurality of inclusions in a first matrix material, wherein a third refractive index of the first matrix material is larger than a fourth refractive index of a fifth material of the inclusions.

Also, the second layer in the example photonic reflector device may be between the first layer and the third layer. The second material may be between the first material and the second layer. The interface between the first and second materials may be a prismatic interface. The first material may include Mg—$ZrO_2$ and the second material may include $MgAl_2O_4$. The second layer may include a plurality of fibers formed of the fourth material, with the fibers embedded in the third material. The third material may be a ceramic material. The fibers may be SiC fibers, and the third material may be selected from the group consisting of $SiO_2$, $(RE)_2SiO_5$, and $(RE)_2Si_2O_7$, wherein RE represents a rare earth element. The SiC fibers may have a diameter of less than 4 μm and may comprise a coating over their surfaces, wherein the coating comprises a material selected from the group consisting of $SiO_2$, $(RE)_2SiO_5$, and $(RE)_2Si_2O_7$, and wherein a thickness of the coating may be in a range of 1% to 25% of the diameter of the SiC fibers. The inclusions may be pores in the first matrix material. The first matrix material may include Mg—$ZrO_2$ and the inclusions may include $MgAl_2O_4$.

An example method of reflecting heat flux emitted by a heat source contained within a cavity includes providing a photonic reflector device on an inner surface of the cavity. The photonic reflector device includes a first layer having a first side opposite a second side, a second layer including a photonic crystal adjacent to the second side of the first layer, and a third layer on an opposite side of the second layer from the first layer. The method includes causing the heat source to emit the heat flux, at least a portion of the heat flux being incident on and reflected by the photonic reflector device. The first layer reflects at least 30% of the heat flux incident on the first side, and the third layer scatters at least a portion of the heat flux that is transmitted through the first and second layers via diffuse reflection. At least 95% of the heat flux that is reflected by the second and third layers and is incident on the second side of the first layer is transmitted through the first layer. The photonic reflector device may reflect at least 60% of the heat flux emitted by the heat source. A wavelength of the heat flux may be in a range of 0.4 μm to 5 μm.

A photonic crystal according to another example embodiment includes a matrix material having a first group of fibers in the matrix material and a second group of fibers in the matrix material below the first group of fibers. The fibers of the first group have a higher refractive index than the matrix material, wherein the fibers of the first group are aligned in a first direction, thereby causing the photonic crystal to have a periodic potential along a first dimension. The fibers of the second group have a higher refractive index than the matrix material, wherein the fibers of the second group are aligned in a second direction, thereby causing the photonic crystal to have a periodic potential along a second dimension. The photonic crystal may include an angle between the first and second directions in a range of 80° to 100°. The fibers of the first and second groups may be SiC fibers, and the matrix material may be selected from the group consisting of $SiO_2$, $(RE)_2SiO_5$, and $(RE)_2Si_2O_7$, wherein RE represents a rare earth element. The SiC fibers may have a diameter of less than 4 μm and include a coating over their surfaces, wherein the coating may include a material selected from the group consisting of $SiO_2$, $(RE)_2SiO_5$, and $(RE)_2Si_2O_7$, and wherein a thickness of the coating may be in a range of 1% to 25% of the diameter of the SiC fibers.

DESCRIPTION OF DRAWINGS

Like reference symbols in the various figures indicate like elements.

DETAILED DESCRIPTION

Figure 1:
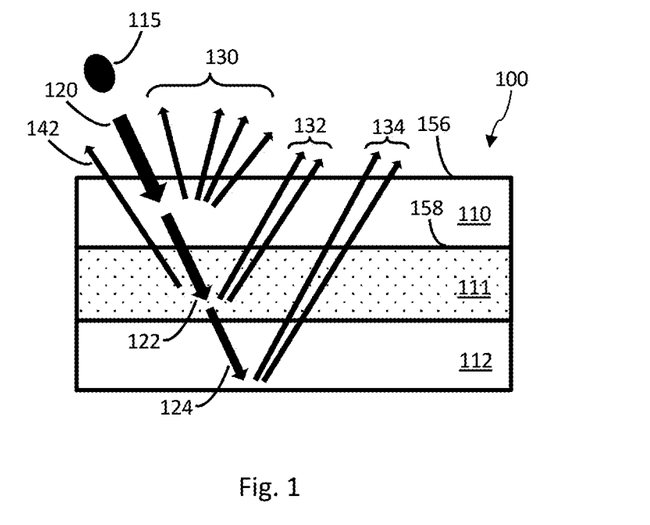
FIGS. 1-2 are schematic illustrations of an example embodiment of a photonic reflector device.
Figure 2:
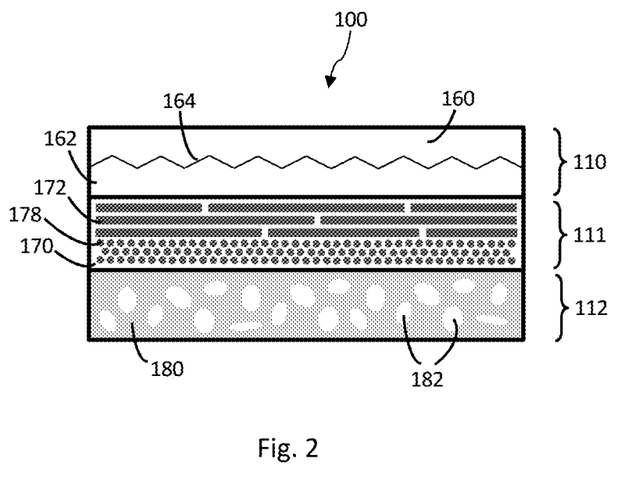

FIGS. 1-2 illustrate an example embodiment of a photonic reflector device 100 that includes a first layer 110, a second layer 111, and a third layer 112. Second layer 111 may be between first layer 110 and third layer 112. The first layer 110 is configured as a retro-reflector, second layer 111 is configured as a photonic crystal, and third layer 112 is configured as a scattering layer (e.g., a Lambertian scatterer). FIG. 1 includes a schematic illustration of incoming light rays 120, 122, and 124 and reflected/scattered light rays 130, 132, 134, and 142 that are emitted by a radiation source 115 and are incident on device 100. FIG. 2 illustrates various features and components of first, second, and third layers 110-112. First, second, and third layers 110-112 each rely on a different photonic mechanism to reflect or scatter the incoming incident light rays 120, 122, and 124. In combination, first, second, and third layers 110-112 may be optimized to synergistically reflect targeted wavelengths and/or polarizations of light, and in particular may be configured such that photonic reflector device 100 reflects a larger percentage of the targeted wavelengths and/or polarizations of light than any of the first, second, and third layers 110-112 are capable of reflecting individually. First, second, and third layers 110-112 may each be individual modules that are stacked on top of one another to form photonic reflector device 100, thereby providing flexibility in layout and design.

Referring to FIG. 1, first layer 110 includes a first side 156 opposite a second side 158, second side 158 being between second layer 111 and first side 156. First layer 110 is configured to reflect at least 30% of light within a first targeted bandwidth (e.g., light having a wavelength in a range of 0.4 μm to 5 μm, or in a range of 0.5 μm to 3 μm) that is incident on first side 156 and to reflect less than 5% of light within the first targeted bandwidth (e.g., light having a wavelength in a range of 0.4 μm to 5 μm, or in a range of 0.5 μm to 3 μm) that is incident on the second side 158. That is, for light within the first targeted bandwidth that is emitted by radiation source 115, at least 30% of the incoming light ray 120 that is incident on first side 156 of first layer 110 is reflected by first layer 110 (light rays 130), with the remainder (incoming light ray 122) being transmitted through first layer 110. Of the incoming light transmitted into second and third layers 111 and 112 (incoming light rays 122 and 124, respectively), at least a portion is reflected as light rays 132, 142, and 134 back towards first layer 110.

First layer 110 is configured such that the majority of the reflected/scattered light rays (e.g., rays 132, 142, and 134) that are incident on second side 158 of first layer 110 are transmitted back through first layer 110, with less than 5% of this light being reflected back downwards. Second layer 111 includes or is formed as a photonic crystal. Third layer 112 is configured to scatter incident light within a second targeted bandwidth (e.g., light having a wavelength in a range of 0.4 μm to 5 μm). Optionally, the second targeted bandwidth may be a subset of the first targeted bandwidth, the first targeted bandwidth may be a subset of the second targeted bandwidth, or the first and second targeted bandwidths may be the same. As further described below, first, second, and third layers 110-112 may be configured such that photonic reflector device 100 reflects at least 70% of light within a specific targeted bandwidth (e.g., light having a wavelength in a range of 0.1 μm to 5 μm, for example in a range of 0.4 μm to 5 μm or 0.5 μm to 3 μm) that is incident on the first side 156 of first layer 110.

Referring to FIG. 2, first layer 110 includes a first material 160 contacting a second material 162. First and second materials 160 and 162, respectively, have a non-planar interface 164 therebetween. First material 160 has a larger refractive index than second material 162. For example, first and second materials 160, 162 may be selected such that a first refractive index of first material 160 is at least 1.1 times (e.g., at least 1.15, at least 1.2, at least 1.25, at least 1.3, at least 1.35, at least 1.4, at least 1.45 or at least 1.5 times) a second refractive index of second material 162. Second layer 111, which in the embodiment shown in FIGS. 1-2 is positioned between first and third layers 110 and 112, respectively, includes or is formed of a third material 170 and a fourth material 172/178 having different refractive indices from one another. As described in detail below, third and fourth materials 170, 172/178 are configured such that second layer 111 has a periodic optical potential along at least one dimension. As such, second layer 111 is configured as a photonic crystal. Third layer 112 includes a plurality of inclusions 182 in a first matrix material 180, inclusions 182 being formed of a fifth material. A third refractive index of first matrix material 180 is larger than a fourth refractive index of the fifth material (i.e., the material of the inclusions 182).

First layer 110 is configured to reflect a substantial amount (e.g., at least 30%) of the incoming light ray 120 from radiation source 115 that is incident on first side 156 of first layer 110. Of the incoming light ray 120 that is transmitted through first layer 110, a portion is reflected and/or scattered back upwards (132, 142) by second layer 111, and a portion is reflected and/or scattered back upwards (134) by third layer 112. First layer 110 is further configured to transmit most or all (e.g., at least 95%) of the reflected/scattered light rays (132, 134, 142) that are incident on second side 158 of first layer 110. This can be achieved by forming first layer 110 of a first material 160 contacting a second material 162, whereby second material 162 is between first material 160 and second layer 111, and first material 160 has a refractive index that is larger than that of second material 160.

In order for incoming light ray 120 that is incident on first layer 110 to be totally reflected, the angle of incidence $\theta_i$ of light ray at non-planar interface 164 (between first and second materials 160, 162 of first layer 110) has to be greater than the critical angle for total internal reflection $\theta_c=\sin^{-1}(n_{162}/n_{160})$, where $n_{160}$ is the refractive index of first material 160 and $n_{162}$ is the refractive index of second material 162. As such, the critical angle $\theta_c$ is decreased by selecting materials such that $n_{160}$ is much larger than $n_{162}$. For example, as previously described, $n_{160}$ may be at least 1.1 times (e.g., at least 1.15, at least 1.2, at least 1.25, at least 1.3, at least 1.35, at least 1.4, at least 1.45 or at least 1.5 times) $n_{162}$.

Figure 3:
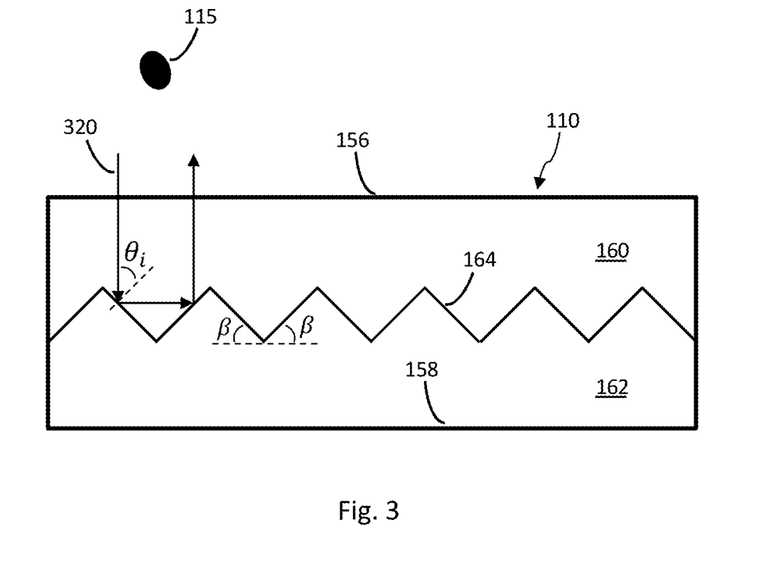
FIGS. 3-4 are schematic illustrations of example retro-reflector layers of a photonic reflector device.

Additionally, configuring interface 164 between materials 160 and 162 to be non-planar can further increase the percentage of light that is reflected by first layer 110, particularly for light that is incident on first layer 110 at a normal or near-normal angle. For example, FIG. 3 shows a schematic illustration of first layer 110 in which non-planar interface 164 between materials 160 and 162 is a prismatic interface, resembling an array of truncated corners of cubes with each surface portion of non-planar interface 164 having a slope angle β relative to first side 156. In the case that β is about equal to 45 degrees, an incoming light ray 320 that is incident at a normal angle relative to first side 156 will be incident on non-planar interface 164 at an angle of incidence $\theta_i$ of about 45 degrees. If the refractive index discontinuity between first and second materials 160 and 162 is properly selected, most or all of the light from incoming light ray 320 is reflected in an approximately horizontal direction and then again reflected back towards radiation source 115, as shown. Other values for the angle β may be selected to optimize for cases where the incoming light is incident from other directions.

In applications in which the radiation source (e.g., 115 in FIG. 1) is a heat source and the light rays are heat flux being emitted by the heat source, first and second materials 160 and 162 may be refractory materials that are stable at high temperatures. Additionally, first and second materials 160 and 162 may be selected such that they have similar thermal expansion coefficients. For example, the thermal expansion coefficient of first material 160 may be within 20% (e.g., within 15%, 10%, 8%, 6%, 4%, or 2%) of the thermal expansion coefficient of second material 162. Furthermore, in order to prevent conduction of heat through first and second materials 160 and 162, respectively, first and second materials 160 and 162 may be selected to have a low thermal conductivity (e.g., less than 40 W/m·K, less than 35 W/m·K, less than 30 W/m·K, less than 25 W/m·K, or less than 20 W/m·K). Finally, first and second materials 160 and 162 may be selected such that they are not chemically reactive with one another, even at higher temperatures.

In the embodiments shown in FIGS. 2-3, first material 160 has a larger refractive index than second material 162. The first material 160 having the larger refractive index may be formed of magnesium stabilized cubic zirconia (i.e., Mg—$ZrO_2$), and the second material 162 having the lower refractive index may be formed of magnesium aluminate spinel ($MgAl_2O_4$). Such a structure of first material 160 and second material 162 may be formed via additive manufacturing techniques. For example, the Mg—$ZrO_2$ may be 3D printed using a micro-printer and a UV curable resin filled with sub-micron ceramic particles. The minimal layer thickness is limited by the printer's resolution, which is typically about 2 μm. This could result in a surface roughness of approximately the same magnitude, which could lower reflection efficiency. As such, the printed parts may be smoothed by vapor polishing or vibratory finishing. For integration of the $MgAl_2O_4$ material, the printed Mg—$ZrO_2$ layer may be submerged in a UV curable ceramic resin such that the corner-cube points reach just below the resin level. The top can then be cured in a single exposure with high intensity UV light. The resulting first layer 110 may then undergo heat treatment and sintering into ceramic. Shrinkage of approximately 30% may be expected and can be accounted for in the design.

Figure 4:
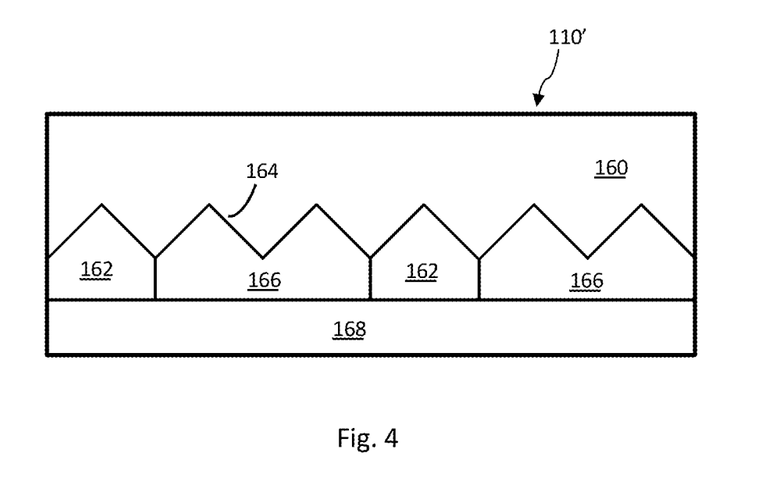

In FIG. 3, an ideal material for second material 162 with the lower refractive index is air. However, such a structure would be mechanically unstable. FIG. 4 is a schematic illustration of another embodiment of first layer 110' configured as a retro-reflector that may be in photonic reflector device 100 and which incorporates air portions 166 to create specific areas having a smaller critical angle along non-planar interface 164. As illustrated in FIG. 4, second material 162 having the lower refractive index is broken up into several regions with air portions 166 in between. For mechanical stability, the regions of second material 162 are mounted on a substrate 168, which may for example be formed of a ceramic material. Alternatively, substrate 168 may be omitted, and the regions of second material 162 may be mounted directly on and supported by (e.g., sintered to) second layer 111 of photonic reflector device 100.

Figure 5A:
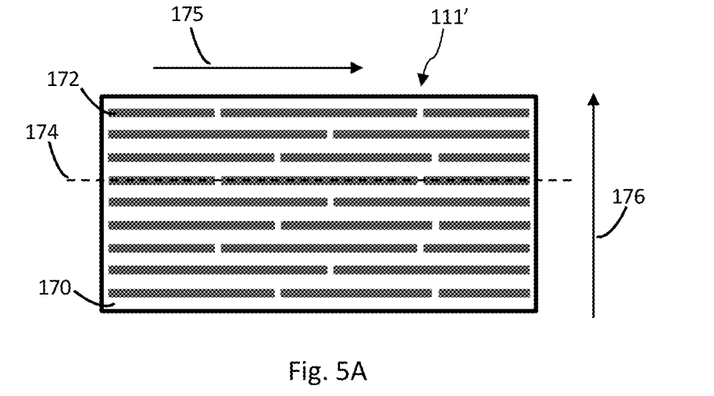
FIGS. 5A-5B and 6 are schematic illustrations of example photonic crystal layers of a photonic reflector device.
Figure 5B:
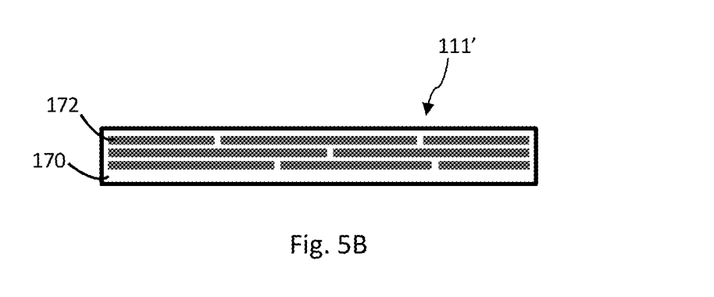

As described in the embodiments of FIGS. 1-2, second layer 111 of photonic reflector device 100 may function as a photonic crystal. Photonic crystals rely on periodic optical potentials to reflect nearly all incident optical power within a specific bandwidth by prohibiting propagation of photons having energies corresponding to the specific bandwidth. FIGS. 5A and 5B are illustrations of an embodiment of a photonic crystal 111' that may be used for second layer 111. FIG. 5A is a plan view of photonic crystal 111', and FIG. 5B is a cross-sectional view along dashed line 174. Photonic crystal 111' includes a plurality of fibers 172 (e.g., a first group of fibers) embedded in a third material 170 that may function as a matrix material, the fibers 172 are embedded in the third material 170 and have a different (e.g., a higher) refractive index than the third material 170. The fibers 172 may be implemented as fibers, micro-fibers, or whiskers. The fibers 172 may each have a diameter of less than 4 μm (e.g., less than 2 μm). As seen in FIG. 5A, the fibers 172 are aligned along the direction indicated by arrow 175 (e.g., a first direction) and are spaced periodically along the direction indicated by arrow 176, thereby creating a periodic optical potential along a first dimension, i.e., in the direction indicated by arrow 176. As seen in FIG. 5B, the fibers 172 may also be stacked periodically in the direction indicated by arrow 177, thereby creating a periodic optical potential along the direction indicated by arrow 177. Matrix material 170 may, for example be a ceramic material. Fibers 172 may, for example, be SiC fibers, and matrix material 170 may be $SiO_2$, $(RE)_2SiO_5$, or $(RE)_2Si_2O_7$, wherein RE represents a rare earth element such as yttrium. The SiC fibers may have a diameter of less than 4 μm and may include a $SiO_2$, $(RE)_2SiO_5$, or $(RE)_2Si_2O_7$ coating over their surfaces, where a thickness of the coating is in a range of 1% to 25% of the diameter of the SiC fibers. When the coating on the SiC fibers is formed of $SiO_2$, $(RE)_2SiO_5$, or $(RE)_2Si_2O_7$, the matrix material 170 may be formed of the same material as that of the coating, or alternatively may be formed of a different material from that of the coating.

Figure 6:
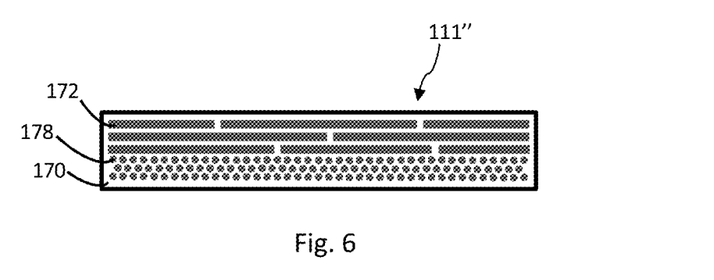

FIG. 6 illustrates a cross-sectional view of another embodiment of a photonic crystal 111" that may be used for second layer 111. Photonic crystal 111" is similar to photonic crystal 111', but further includes a second group of fibers 178 that have a higher refractive index than matrix material 170 and are aligned in a second direction 176, i.e., along the direction indicated by arrow 176 in FIG. 5A. The fibers 178 of the second group may be aligned at normal angles (or near normal angles) relative to the fibers 172 of the first group. For example, the angle between the first direction 175 and the second direction 176 may be in a range of 80° to 100°. The fibers 178 of the second group are spaced periodically along the direction indicated by arrow 175 in FIG. 5A. Accordingly, in photonic crystal 111" the optical potential is periodic in at least two (perpendicular) directions. As seen in FIG. 6, the fibers 172 and 178 may also be stacked periodically in the direction indicated by arrow 177, thereby creating a periodic optical potential along the direction indicated by arrow 177 in addition to the periodic optical potential along each of the other two directions (175 and 176), resulting in a periodic potential along three dimensions. The fibers 178 of the second group may be implemented as fibers, micro-fibers, or whiskers. The fibers 178 may each have a diameter of less than 4 µm (e.g., less than 2 µm). Fibers 172 and 178 may, for example, be SiC fibers, and matrix material 170 may be $SiO_2$, $(RE)_2SiO_5$, or $(RE)_2Si_2O_7$, wherein RE represents a rare earth element such as yttrium. The SiC fibers may have a diameter of less than 4 µm and may include a $SiO_2$, $(RE)_2SiO_5$, or $(RE)_2Si_2O_7$ coating over their surfaces, where a thickness of the coating is in a range of 1% to 25% of the diameter of the SiC fibers.

The bi-layer structure of photonic crystal 111" in FIG. 6 may result in a complete photonic gap for both transverse-electric (TE) and transverse magnetic (TM) polarizations of incoming light. As such, the overall stack can possess a complete photonic gap for all incoming polarizations. Although not shown in FIG. 6, additional layers of fiber with different fiber diameter and/or spacing can be added to broaden the photonic bandgap. Structures such as those in photonic crystal 111" of FIG. 6 can cause incoming radiation that is incident at an oblique manner to be anomalously diffracted towards the source of the incident radiation with large angles. For example, as illustrated in FIG. 1, radiation of incoming light ray 122 incident obliquely on second layer 111 can be diffracted back upwards in the direction indicated by light ray 142.

The structures of photonic crystal 111' in FIGS. 5A-5B and photonic crystal 111" in FIG. 6 may, for example, be formed by aligning short SiC fibers in a UV curable resin by shear and/or magnetic fields using precision 3D printers. By slowly removing the resin and growing a $SiO_2$ or $RE_2Si_2O_7$ layer on the surface of the SiC fibers with a heat treatment, a regular inter-fiber spacing is achieved. The process is then repeated in order to form additional fiber layers. This approach can be more scalable and cost efficient as compared to approaches based on two-photon lithography or standard lithography.

The SiC fibers may be sourced with different diameters and lengths, for example a diameter of about 0.65 µm and a length of about 12 µm. Alignment of the fibers may be achieved by suspending the fibers in a UV curable resin in a 3D printer and utilizing the shear motion of the 3D printer's wiper blade. First, a thin layer of fiber slurry is deposited on a platform, after which the wiper blade of the printer swipes over the slurry at a specified height above the surface, e.g., about 10 µm. The fibers align themselves under the exerted shear force while the excessive resin on the top is removed. The layer is then cured with UV light, thereby causing the fibers to be immobilized. The resin rheology, the length of the fibers, and the layer height may be optimized to ensure proper alignment. A second photonic crystal layer oriented 90° to the first layer may be easily made by simply rotating the part by 90° and repeating the process. To create a regular inter-fiber spacing, the resin is completely removed with a heat treatment in air. This heat treatment simultaneously grows a 100-200 nm $SiO_2$ layer on the SiC via thermal oxidation according to the reaction: $SiC+O_2 \rightarrow SiO_2+CO_2$. A subsequent sintering can fuse the $SiO_2$ scales on the SiC fibers together and preserve the structure's mechanical rigidity. Guided by the simulations, the starting SiC fiber diameter and oxide scale thickness may be optimized to create a bandgap at the desired wavelength(s).

The performance and efficacy of second layer 111 being configured as a photonic crystal depends strongly on the degree of order, which in this case corresponds to the alignment of the SiC fibers. In cases where sufficiently accurate alignment cannot be achieved by the shear motion techniques described above, magnetic fields may be used either alternatively or in combination with the shear motion techniques. In order to use magnetic fields for this purpose, the SiC fibers may be coated (e.g., by chemical vapor deposition) with a magnetic rare-earth (RE) metal such as Nd or Sm. After heat treatment in an oxidizing environment, the rare-earth coating forms a low index, high temperature stable, rare-earth silicate according to the reaction: $SiC+RE+O_2 \rightarrow Y_2Si_2O_7+CO_2$.

Figure 7:
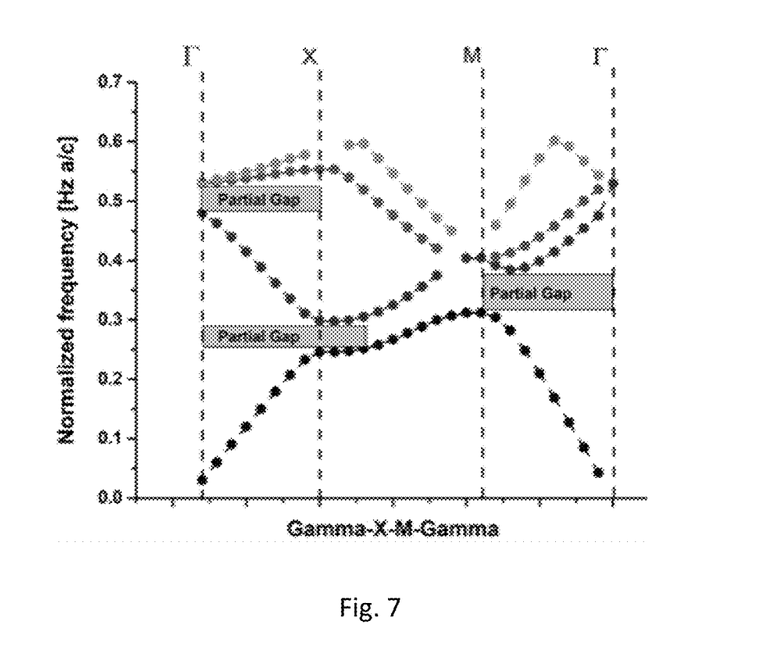
FIG. 7 illustrates the band structure for SiC fibers in $Y_2Si_2O_7$ calculated using the Finite-difference time-domain (FDTD) method.
Figure 8A:
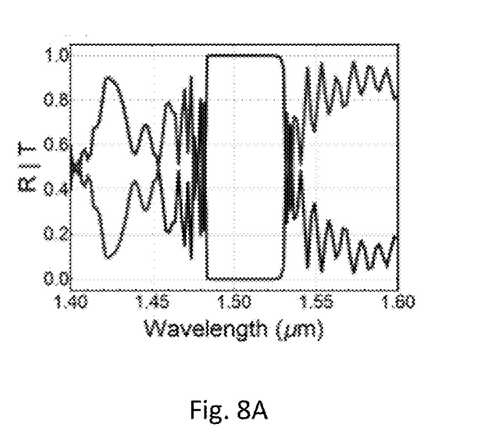
FIGS. 8A and 8B illustrate calculated reflection and transmission spectra of various photonic crystal structures.
Figure 8B:
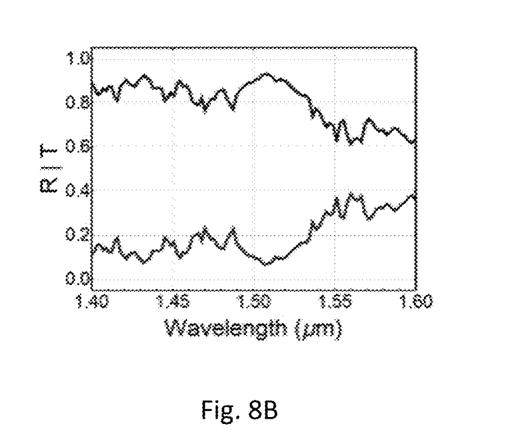

FIG. 7 shows the band structure for SiC fibers in $Y_2Si_2O_7$ calculated using the Finite-difference time-domain (FDTD) method. As can be seen, this band structure demonstrates partial bandgaps at several crystallographic locations and direction. Particularly, the partial gap at M point in Gamma-M direction corresponds to a wavelength of 3000 nm. Additional FDTD calculations were performed to demonstrate reflectivity of a perfect photonic crystal (FIG. 8A) and a photonic crystal with fabrication imperfections modeled as a random normal distribution offset to the placement of each rod with a standard deviation of 75 nm (FIG. 8B). The reflection and transmission spectra correspond to a photonic crystal with 40×40 fibers having a diameter of 1100 nm placed in a square lattice with a periodicity of 1600 nm exhibiting a photonic gap at a wavelength of 1500 nm.

Referring to the example embodiment of photonic reflector device 100 shown in FIGS. 1-2, any incoming light ray 124 that is transmitted through first and second layers 110 and 111 is incident on third layer 112, which functions as a scattering layer (e.g., Lambertian scatterer). As shown in FIG. 2, third layer 112 includes plurality of inclusions 182 in first matrix material 180, wherein the refractive index of first matrix material 180 is larger than the refractive index of the inclusions 182. Third layer 112 is configured to scatter incoming light ray 124 via diffuse reflection. The specific properties of third layer 112 are determined by the relative refractive indices of first matrix material 180 and inclusions 182, as well as the size distribution and density of inclusions 182.

In applications in which the radiation source (e.g., 115 in FIG. 1) is a heat source and the incoming light rays are heat flux being emitted by the heat source, first matrix material 180 and optionally the material of inclusions 182 may be refractory materials that are stable at high temperatures. Additionally, first matrix material 180 and material of inclusions 182 may be selected such that they have similar thermal expansion coefficients. For example, the thermal expansion coefficient of first matrix material 180 may be within 20% (e.g., within 15%, 10%, 8%, 6%, 4%, or 2%) of the thermal expansion coefficient of material of inclusions 182. Furthermore, first matrix material 180 may be selected to have a low thermal conductivity (e.g., less than 40 W/m·K, less than 35 W/m·K, less than 30 W/m·K, less than 25 W/m·K, or less than 20 W/m·K). Finally, first matrix material 180 and material of inclusions 182 may be selected such that they are not chemically reactive with one another, even at higher temperatures.

In view of the above, first matrix material 180 may be formed of a ceramic material such as Mg—$ZrO_2$, and material of inclusions 182 may be $MgAl_2O_4$ or air (i.e., pores in the matrix). Inclusions 182 may each have an average diameter ranging from about 1 micron to about 5 microns and may be randomly distributed within first matrix material 180. Such a structure may cause at least 30%, and up to 60%, of light 124 having a wavelength of about 0.4 microns to 5 microns that penetrates through layers 110 and 111 to be reflected back upwards towards layer 110.

Structures such as those described above for third layer 112 may be formed by incorporating low index particles (e.g., $MgAl_2O_4$ particles) or pores in the high index matrix material (e.g., Mg—ZrO$_2$) either by including the low index particles or by including polymer spheres that turn into pores in the ceramic resin feedstock used to form first matrix material 180. In the latter case, the polymer spheres, which may be 20 wt % polymethylmethacrylate spheres having an average diameter of 30 µm, can burn out upon heat treatment, thereby resulting in the inclusions 182 being pores. Theoretical modeling indicates that pore diameters for inclusions 182 in the range of 2-4 µm are suitable for scattering light having a wavelength in the range of 0.5-3 µm. Third layer 112 may then be 3D printed via controlled extrusion of the feedstock material. Size distribution and volume fraction of inclusions 182 may then be tailored layer by layer during 3D printing to cover the broadband wavelengths of interest. Ideally, the angular response of such a layer results in the radiation scattering evenly towards all 2pi directions regardless of angle of incidence, a phenomenon called Lambertian reflection. However, in reality such surfaces show mostly Lambertian and semi-specular scattering, where an angular distribution superimposes the Fresnel reflection.

Third layer 112 may be configured for the purpose of broadband high-reflection scattering to further help with overall radiative heat reflection. Because third layer 112 includes a specular component, it is in many cases possible to control the direction of scattering by coupling third layer 112 to second layer 111 configured as a photonic crystal layer such as illustrated in FIGS. 5A, 5B, and 6.

The first, second, and third layers 110-112 of photonic reflector device 100 may be independently tailored and layered to achieve reflection of targeted wavelengths and angle of incidence. Simulations have estimated that over 70% of thermal radiation from a 2200° C. source at a 90 degree incidence angle can be reflected, which translates to a reduction of radiative thermal heat transfer by 50% as compared to a state-of-the-art (SOA) thermal barrier coating (TBC) that transmits about 80% of this radiation. Any transmitted radiation is absorbed by the underlying metal structure. Assuming a typical convective to radiative heat transfer ratio of 80:20, photonic reflector device 100 could reduce the total heat transfer by as much as 15%.

The fabrication processes for each of first, second, and third layers 110-112 may be adapted to scale, especially as 3D printing technology matures continuously. First layer 110 may be configured as a retro-reflector that is relatively size agnostic and may be easily 3D printed or templated with molds. For high rate manufacturing, ceramic injection molding could be used. Second layer 111 may be configured as a photonic crystal layer that may be scaled up via tiling, where the structures are made in tiles and then bonded or mechanically fastened to the structure. Third layer 112 may be configured as a Lambertian scattering layer and may be applied via spraying and UV curing techniques. Alternatively, tiling may be applied to the entire 3-layer structure.

Figure 9A:
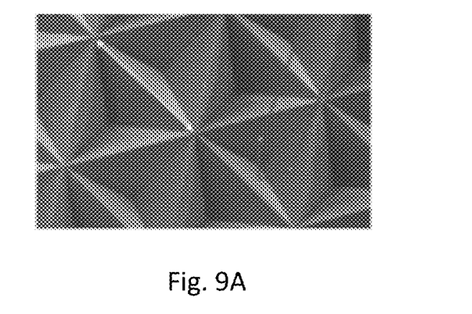
FIGS. 9A-9C are scanning electron microscopy (SEM) images of layers of a photonic reflector device.
Figure 9B:
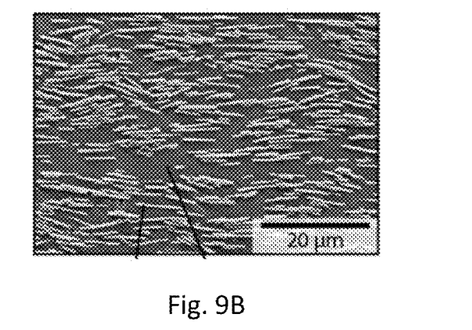
Figure 9C:
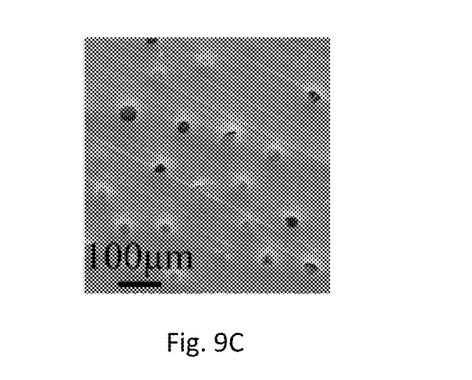

Scanning electron microscopy (SEM) images of structures fabricated for use as first, second, and third layers 110-112 are shown in FIGS. 9A-9C. The SEM image of FIG. 9A shows a top-down view of a first layer 110 configured as a retro-reflector layer having a corner-cube type geometry. FIG. 9B shows a top-down view of aligned fibers in a pre-ceramic resin during the fabrication of a second layer 111 configured as a photonic crystal layer. FIG. 9C is a cross-sectional SEM image of a third layer 112 configured as a diffuse scattering layer.

Photonic reflector device 100 may be adapted for use in a variety of applications that have a need for directional or non-directional reflection of light with wavelengths ranging from the visible to short infrared. For example, photonic reflector device 100 may be used as thermal barrier coatings in applications such as jet engines, scram jets, or rocket propulsion. In all of these applications, internal reflecting coatings may contain radiative heat within the enclosure structure or cavity in which the radiative heat is generated (e.g., combustion chamber, nozzle, exhaust, etc.), thereby increasing performance via higher operating temperatures without the need for additional cooling. Photonic reflector device 100 can also allow for directionality control and tuning of optical responses beyond just reflectance in a broad range of applications, for example thermophotovoltaics, high temperature electronic devices, or heat signature control. Accordingly, the ability of photonic reflector device 100 to reflect radiative heat flux towards the source is useful not only for thermal management but also for concealment of infrared signatures.

Figure 10:
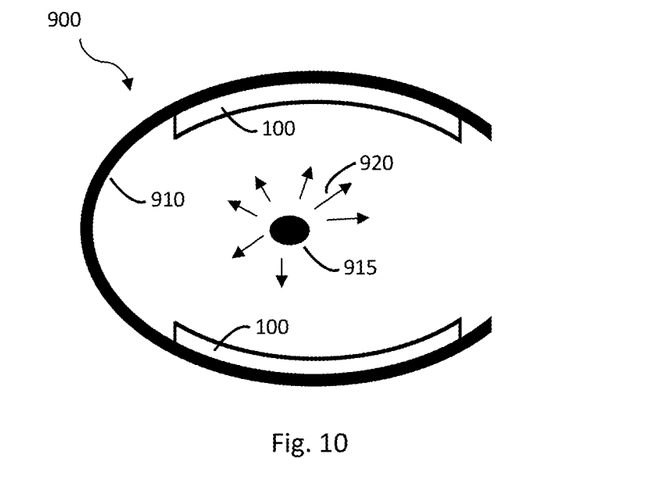
FIG. 10 is a schematic illustration of a photonic reflector device on the inner surface of a cavity containing a heat source.
Figure 11:
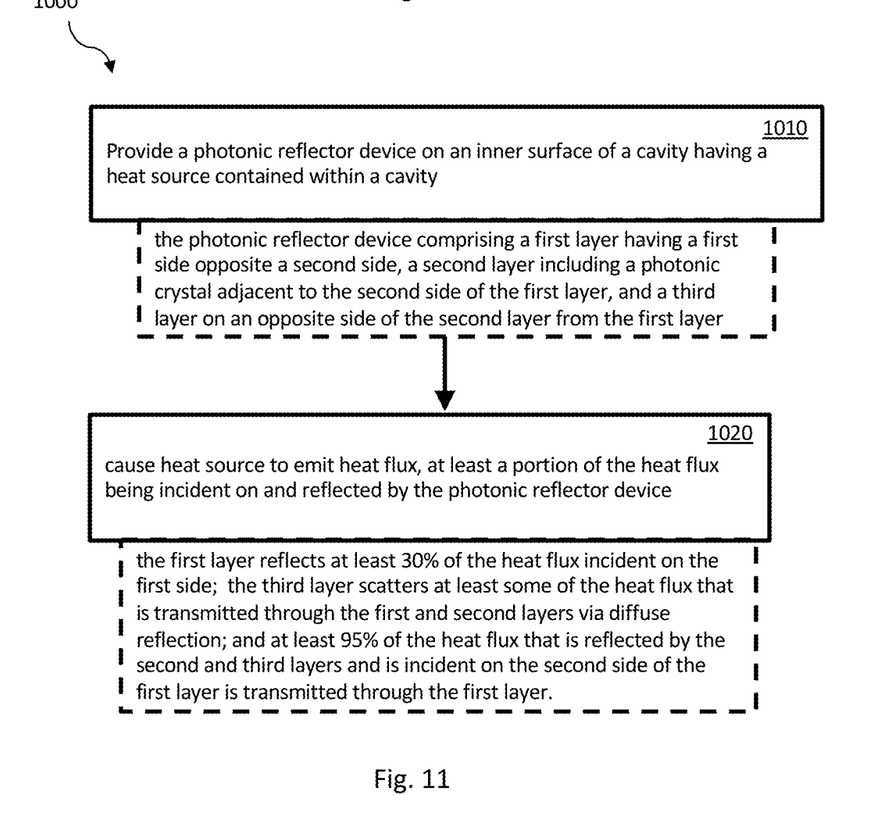
FIG. 11 illustrates a method of reflecting heat flux towards a source of the heat flux.

FIG. 10 illustrates the use of photonic reflector device 100 on an inner surface 910 of a cavity 900 (e.g., a rocket engine enclosure) containing a heat source 915. FIG. 11 illustrates a method 1000 of reflecting heat flux 920 emitted by heat source 915 contained within cavity 900. Method 1000 includes (i) providing a photonic reflector device on inner surface 910 of cavity 900 (step 1010), and (ii) causing heat source 915 to emit the heat flux 920, at least a portion of the heat flux 920 being incident on and reflected by photonic reflector device (step 1020). The photonic reflector device, which may be photonic reflector device 100 of FIGS. 1-2, includes a first layer having a first side opposite a second side, a second layer including a photonic crystal adjacent to the second side of the first layer, and a third layer on an opposite side of the second layer from the first layer. The first layer reflects at least 30% of the heat flux 920 incident on the first side. The third layer scatters at least a portion of the heat flux 920 that is transmitted through the first and second layers via diffuse reflection. At least 95% of the heat flux 920 that is reflected by the second or third layer and is incident on the second side of the first layer is transmitted back through the first layer. The photonic reflector device may reflect at least 60% of the heat flux. The wavelength of the heat flux 920 may be in a range of 0.5 µm to 3 µm.

A number of example embodiments have been described. Nevertheless, it will be understood that various modifications may be made without departing from the spirit and scope of the devices and methods described herein.

What is claimed is:

1. A photonic reflector device, comprising:
   a first layer comprising a first material contacting a second material, the first and second materials having a non-planar interface therebetween, wherein a first refractive index of the first material is at least 1.1 times a second refractive index of the second material;
   a second layer comprising a third material and a fourth material having different refractive indices from one another, wherein the third and fourth materials are configured such that the second layer has a periodic optical potential along at least one dimension; and
   a third layer comprising a plurality of inclusions in a first matrix material, wherein a third refractive index of the first matrix material is larger than a fourth refractive index of a fifth material of the inclusions.

2. The photonic reflector device of claim 1, wherein the second layer is between the first layer and the third layer.

3. The photonic reflector device of claim 1, wherein the second material is between the first material and the second layer.

4. The photonic reflector device of claim 1, wherein the interface between the first and second materials is a prismatic interface.

5. The photonic reflector device of claim 1, wherein the first material comprises Mg—$ZrO_2$ and the second material comprises $MgAl_2O_4$.

6. The photonic reflector device of claim 1, wherein the second layer comprises a plurality of fibers formed of the fourth material, and the fibers are embedded in the third material.

7. The photonic reflector device of claim 6, wherein the third material is a ceramic material.

8. The photonic reflector device of claim 6, wherein the fibers are SiC fibers, and the third material is selected from the group consisting of $SiO_2$, $(RE)_2SiO_5$, and $(RE)_2Si_2O_7$, wherein RE represents a rare earth element.

9. The photonic reflector device of claim 8, wherein the SiC fibers have a diameter of less than 4 μm and comprise a coating over their surfaces, wherein the coating comprises a material selected from the group consisting of $SiO_2$, $(RE)_2SiO_5$, and $(RE)_2Si_2O_7$, and wherein a thickness of the coating is in a range of 1% to 25% of the diameter of the SiC fibers.

10. The photonic reflector device of claim 1, wherein the inclusions are pores in the first matrix material.

11. The photonic reflector device of claim 1, wherein the first matrix material comprises Mg—$ZrO_2$ and the fifth material of the inclusions comprises $MgAl_2O_4$.

* * * * *